United States Patent Office 3,321,556
Patented May 23, 1967

3,321,556
N - [2 - (O,O - DILOWERALKYL - PHOSPHORODI-
THIO - METHANEMERCAPTO)-ETHYL] CARBA-
MATE OR THIOCARBAMATE ESTERS
Donald G. Stoffey, Corte Madera, and Arnold D. Gutman, Oakland, Calif., assignors to Stauffer Chemical Company, New York, N.Y., a Delaware corporation
No Drawing. Filed Dec. 20, 1963, Ser. No. 332,289
6 Claims. (Cl. 260—938)

This invention relates to certain novel chemical compounds and to the use of such compounds as insecticides, acaricides, nematocides and the like. More specifically, this invention relates to phosphoro derivatives of methylmercaptoethyl carbamates and phosphoro derivatives of methyl-mercaptoethylthio carbamates corresponding to compounds of the formula:

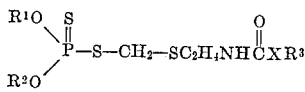

wherein X is oxygen or sulfur, $R^1$ and $R^2$ are lower alkyl radicals and $R^3$ is selected from lower alkyl, phenyl, alkoxy lower alkyl, and phenoxy lower alkyl radicals.

The compounds of the present invention can be prepared by two reactions. In one reaction the salt of a mercaptoethyl carbamate is reacted with an S-chloromethyl-O,O-dialkyl phosphorodithioate. Another method of preparation involves the reaction between a S-2-chloroethylmercaptomethyl - O,O - dialkyl phosphorodithioate, potassium cyanate and a phenyl or alkyl compound containing a mercapto or hydroxy group. It is advantageous to carry out the above reactions under anhydrous conditions and in the presence of a highly polar organic solvent, such as acetone, dioxane, acetonitrile and the like.

Reference is now made to the following non-limiting examples which illustrate the preparation of the compounds of the present invention.

Example 1.—Ethyl N-[2-(O,O-diethyl phosphorodithioylmethylmercapto)-ethyl] carbamate In a 300 ml. flask equipped with a bar magnet stirrer and reflux condenser, were combined 4 g. (0.1 mole) of sodium hydroxide and 100 ml. of isopropyl alcohol. The alcohol was heated until the caustic went into solution. With the caustic in solution, 15 g. (0.1 mole) of ethyl N-2-mercaptoethyl carbamate was then added. To the mixture was also added 30 g. (0.128 mole) of S-chloromethyl - O,O - diethylphosphorodithioate. The reaction mixture was heated at reflux for six hours, then the solvent was removed on a rotary evaporator and 100 ml. of diethyl-ether and 50 ml. of water were added. The water was removed, and the ether solution was washed three times with 50 ml. portions of water. The ether phase was dried with anhydrous magnesium sulfate, and the solvent was removed on a rotary evaporator to give 23.7 g. (68% of theory) of the crude amber colored liquid product. The material had an $n_D^{30}$ 1.5275. The infrared spectrum of the product confirmed the expected structure.

Example 2.—Methyl N-[2-(O,O-dimethylphosphorodithioylmethylmercapto)-ethyl] carbamate In a 500 ml. flask equipped with a thermometer, a reflux condenser and a stirrer, were placed 22.6 g. (0.08 mole of S-2-chloroethylmercaptomethyl-O,O-dimethylphosphorodithioate, 8.1 g. (0.10 mole) of potassium cyanate, and 200 ml. of methanol. The mixture was vigorously stirred and refluxed for three hours. The mixture was filtered and evaporated, and the oily residue was dissolved in 200 ml. of diethyl ether. Then the ether solution was washed two times with 100 ml. portions of water. The ether phase was then dried with anhydrous magnesium sulfate and evaporated. The product was a slightly viscous, yellow liquid, and the yield was 17.6 g. (68.3% of theory). The $n_D^{30}$ was 1.5523. The product was characterized by its infrared spectrum, showing absorption peaks at 3.0, 5.85, 6.30, 7.5, 8.4, 9.8, 12.4 and 15.3 microns.

Example 3.—n-Butyl N-[2-(O,O-dimethylphosphorodithioylmethylmercapto)-ethyl] thiocarbamate In a 500 ml. flask equipped with a thermometer, a reflux condenser and stirrer, were placed 17.0 g. (0.06 mole) of S-2-chloroethyl mercaptomethyl-O,O-dimethylphosphorodithioate, 8.1 g. (0.10 mole) of potassium cyanate, 9.0 g. (0.10 mole) of n-butyl-mercaptan, and 200 ml. of dioxane. The mixture was stirred and heated at 75° C. for four hours. The mixture was filtered and evaporated. Then the residue was dissolved in 200 ml. of diethyl ether and washed with two 100 ml. portions of water. The ether phase was then dried with anhydrous magnesium sulfate and evaporated. The product was stripped under vacuum at 60° C. to remove any unreacted mercaptan. The yield was 22.0 g. (96.8% of theory). The $n_D^{30}$ was 1.5269. The product was characterized by its infrared spectrum.

The following is a list of compounds prepared following the aforedescribed procedures. Compound numbers have been assigned to each compound and are used throughout the balance of the application.

| Compound Number | X | $R^1$ | $R^2$ | $R^3$ |
|---|---|---|---|---|
| 1 | O | Ethyl | Ethyl | Ethyl. |
| 2 | O | Methyl | Methyl | Methyl. |
| 3 | O | ---do--- | ---do--- | Ethyl. |
| 4 | S | ---do--- | ---do--- | n-Butyl. |
| 5 | O | ---do--- | ---do--- | 2-methoxybutyl. |
| 6 | O | ---do--- | ---do--- | Isopropyl. |
| 7 | O | ---do--- | ---do--- | Phenyl. |
| 8 | O | ---do--- | ---do--- | 2-phenoxyethyl. |
| 9 | S | ---do--- | ---do--- | Sec-Butyl. |

The compounds have been tested as insecticides and acaricides according to the following methods.

Acaricidal evaluation test.—The two-spotted mite, Tetranychus telarius (Linn.), is employed in tests for acaricides. Young pinto bean plants in the primary leaf stage are used as host plants. The young pinto bean plants are infested with several hundred mites. Dispersions of the candidate materials are prepared by dissolving 0.1 gram in 10 ml. of a suitable solvent, usually acetone. Aliquots of the toxicant solutions are suspended in water containing 0.0175% v./v. Sponto 221, an emulsifying agent, the amount of water being sufficient to give concentrations of active ingredient ranging from 0.25% to 0.0005%. The test suspensions are then sprayed on the infested pinto bean plants. After seven days the mortalities of adult, nymphal and ovicidal forms were determined. The percentage of kill was determined by comparison with control plants which had not been sprayed with the candidate. The LD–50 value was calculated using well-known procedures. The LD–50 values are reported under columns "2 SM," "Adult," "Nymph" and "Eggs" in the table below.

Systemic evaluation test.—This test evaluates the root absorption and upward translocation of the candidate systemic compound. The two-spotted mite, Tetranychus telarius (Linn.), is employed in tests for systemic activity. Young pinto bean plants in the primary leaf stage are used as host plants. The pinto bean plants are placed in bottles containing 200 ml. of the test solution and held in place with cotton plugs. Only the roots are immersed. The solutions are prepared by dissolving the compounds to be tested in a suitable solvent, usually acetone, and then diluting with distilled water. The final acetone concentration never exceeds 1%. The toxicants are initially tested at a concentration of 10 parts per million (p.p.m.). Immediately after the plants are placed in the test solution they are infested with mites. Mortalities were determined after seven and fourteen days. The percentage of kill is determined by comparison with control plants which have been placed in distilled water only. The LD-50 value was calculated using well-known procedures. These values in p.p.m. are reported under the column "2 SM Systemic" in the table below.

TABLE I.—ACARICIDAL ACTIVITY

| Compound Number | Two-spotted mites (LD-50 values) | | | |
|---|---|---|---|---|
| | 2 SM Adult (percent) | 2 SM Nymph (percent) | 2 SM Eggs (percent) | 2 SM Systemic (p.p.m.) |
| 1 | 0.0003 | 0.003 | 0.008 | 1.0 |
| 2 | 0.001 | 0.03 | 0.08 | 5.0 |
| 3 | 0.001 | <0.01 | 0.08 | 1.0 |
| 4 | 0.0005 | 0.01 | 0.08 | 3.0 |
| 5 | 0.001 | 0.03 | 0.05 | 3.0 |
| 6 | 0.001 | 0.01 | 0.05 | 3.0 |
| 7 | 0.001 | 0.03 | 0.03 | 3.0 |
| 8 | 0.0008 | 0.03 | 0.05 | |
| 9 | 0.001 | 0.03 | 0.05 | 5.0 |

*Insecticidal evaluation test.*—Three insect species are subjected to evaluation tests for insecticides:

(1) American cockroach (A. Roach) *Periplaneta americana* (Linn.).

(2) Spotted milkweed bug (MWB) *Oncopeltus fasciatus* (Dallas).

(3) Housefly (HF) *Musca domestica* (Linn.).

The procedure for the insects is similar to the acaricidal testing procedure. Test insects are caged in cardboard mailing tubes 3⅛″ in diameter and 2⅝″ tall. The mailing tubes are supplied with cellophane bottoms and coarse mesh nylon tops. Each cage is provided with food and water. From ten to twenty-five insects are employed per cage. The caged insects are sprayed with the active candidate compound at various concentrations. Final mortality readings are taken after seventy-two hours.

Housefly evaluation tests differ in the following manner. The toxicant is dissolved in a volatile solvent, preferably acetone, the active compound is pipetted into a petri dish bottom, allowed to air dry and placed in a cardboard mailing tube. Twenty-five female flies, three to five days old, are caged in the tube. The flies are continuously exposed to the known residue of the active compound in the cage. After twenty-four and forty-eight hours, counts are made to determine living and dead insects. The LD-50 values are calculated using well-known procedures.

TABLE II.—INSECTICIDAL ACTIVITY

| Compound Number | HF, μg. | A. Roach, percent | MWB, percent |
|---|---|---|---|
| 1 | >10 | 0.01 | 0.01 |
| 2 | 80 | 0.01 | 0.03 |
| 3 | 80 | 0.01 | 0.03 |
| 4 | 60 | 0.01 | 0.03 |
| 5 | 40 | 0.01 | 0.01 |
| 6 | 50 | 0.008 | 0.05 |
| 7 | 50 | 0.005 | 0.05 |
| 8 | 80 | 0.01 | 0.05 |
| 9 | 50 | 0.01 | 0.08 |

The compounds of the present invention were also found to be particularly effective against salt-marsh caterpillar (*Estigmene acrea* (Drury)) in concentrations equal to or greater than 0.1 percent.

The compounds of the present invention were found to be effective as nematocides at concentrations greater than 110 p.p.m. except for compound number 1, in which case the lowest rate tested and found effective was 10 p.p.m.

The application to a pest habitat of the compounds of the present invention are well known to those skilled in the art. Such applications as dusts, sprays of solutions or dispersions and the like are effective.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. A compound of the formula

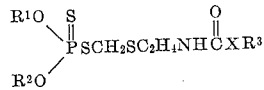

wherein X is selected from the group consisting of oxygen and sulfur, R¹ and R² are lower alkyl radicals, and R³ is selected from the group consisting of lower alkyl, phenyl, alkoxy lower alkyl and phenoxy lower alkyl radicals.

2. The compound ethyl N-[2-(O,O-diethylphosphorodithioylmethanemercapto)-ethyl] carbamate.

3. The compound methyl N-[2-(O,O-dimethylphosphorodithioylmethylenemercapto)-ethyl] carbamate.

4. The compound n-butyl N-[2-(O,O-dimethylphosphorodithioylmethylmercapto)-ethyl] thiocarbamate.

5. The compound phenyl N-[2-(O,O-dimethylphosphorodithioylmethylmercapto)-ethyl] carbamate.

6. The compound 2-methoxybutyl N-[2-(O,O-dimethylphosphorodithioylmethylmercapto)-ethyl] carbamate.

No references cited.

CHARLES B. PARKER, *Primary Examiner.*

ANTON H. SUTTO, *Assistant Examiner.*